United States Patent [19]
Sato et al.

[11] 3,887,673
[45] June 3, 1975

[54] APPARATUS AND METHOD FOR MANUFACTURING TUBULAR FILM OF THERMOPLASTIC RESIN

[75] Inventors: Wasuke Sato; Osamu Uemura, both of Tokyo, Japan

[73] Assignee: Showa Denko Kabushiki Kaisha, Tokyo, Japan

[22] Filed: July 13, 1973

[21] Appl. No.: 378,950

Related U.S. Application Data

[63] Continuation-in-part of Ser. No. 164,599, July 21, 1971, abandoned.

[30] Foreign Application Priority Data
July 24, 1970 Japan.............................. 45-64331
Dec. 8, 1970 Japan.............................. 45-108080

[52] U.S. Cl. .................... 264/89; 264/90; 264/95; 264/178 R; 264/237; 425/71; 425/326 R; 425/378
[51] Int. Cl............................................. B29d 23/04
[58] Field of Search............ 264/95, 178 R, 180, 90, 264/237, 89, 209, 210 R; 425/71, 72, 326 R, 378, 388

[56] References Cited
UNITED STATES PATENTS
3,008,186 11/1961 Voigt................................. 425/326
3,142,092 7/1964 Ralston........................... 264/178 R
3,385,918 5/1968 Jack et al............................ 264/180
3,450,806 6/1969 Matsuo et al......................... 264/95
3,546,745 12/1970 Ball....................................... 425/71
3,663,134 5/1972 Coquelin............................... 264/95

Primary Examiner—Jeffery R. Thurlow
Attorney, Agent, or Firm—Kurt Kelman

[57] ABSTRACT

The invention disclosed provides an apparatus and method for manufacturing tubular film by passing an extruded tubularly inflated thermoplastic resin film into a coaxial cooling hole of a water-cooling tank. The cooling hole is fitted with a pliable element over the cylindrical wall surfaces of a cooling zone, a sizing zone and a draining zone. In passing the cooling zone, the pliable element cools the film to a temperature just above the point of crystallization. In the sizing zone, the film is cooled to a temperature below the crystallization point and, at the same time, tubular form is conferred to the film by internal inflation pressure and by suction in the sizing zone. Water adhering to the surface of the film is removed at the draining zone.

11 Claims, 3 Drawing Figures

APPARATUS AND METHOD FOR MANUFACTURING TUBULAR FILM OF THERMOPLASTIC RESIN

This application for U.S. patent is a continuation-in-part of application Ser. No. 164,599, filed July 21, 1971, now abandoned.

This invention relates to an apparatus and method for manufacturing tubular film of thermoplastic resin by biaxial inflation stretching using water-cooled inflation. More particularly, the present invention relates to an apparatus and method for processing tubular film by passing an extruded tubularly inflated film of thermoplastic resin into a water-cooling tank fitted with a pliable element over cylindrical wall surfaces of a cooling zone, a sizing zone and a draining zone.

It is well known in the art that formation of a tubular film may be accomplished by extruding a resin from an extruding machine and into a die having a ring-shaped opening wherein the film is maintained under a suitable inner pressure exerted by air which is introduced at the center of the ring die. This process generally produces an inflated film having a diameter larger than that of the ring die. If, during the formation of film, the required cooling is performed by the use of air, the cooling speed is low. For this reason, there have been proposed a number of water-cooling methods which are based on a variety of principles.

In water-cooled inflation, film formation becomes less stable with increasing thickness of the film and with decreasing speed of film take up. Further, the stability of film formation tends to be degraded in proportion to the decrease in the value of the melt index of the resin and to be improved in proportion to the decrease in the diameter of the film to be formed.

One example of a prior art water-cooling method discharges cold water from a water-cooling tank made of an annular member having an inside diameter larger than the diameter of the inflated film. Water is allowed to flow down the surface of the extruded film to effect cooling of the film. In accordance with this method, the inner pressure of the film is, at most, about 0.5 mm. In case of a film having a thickness of about 10–40 microns, this inner pressure is found sufficient for pressing the film against the inner wall of the water-cooling tank, and, consequently, for maintaining it in tubular form even after the step of cooling. Where the film thickness increases to exceed 100 microns, however, it becomes difficult to maintain the film in tubular form with such low magnitude of inner pressure. This trend becomes all the more conspicuous with the increasing thickness of the film.

Another prior art water-cooling method requires a mandrel which is inserted in the extruded film being passed through the water-cooling tank. In accordance with this method, even where the film has a larger thickness and the inner pressure fails to maintain the film in tubular form as mentioned above, the film can be nevertheless shaped as required without deformation because it is brought into contact with the mandrel inserted therein. In contrast to this feature, the inner surface of the film which has rubbed against the surface of mandrel consequently sustains numerous scraping scars which remain there even after the stretching of the film and seriously spoil the appearance of the stretched film. In this case, an extruded film free from such scraping scars may be obtained by allowing the film to be raised slightly from the mandrel surface. However, a considerably higher inner pressure is needed in order to maintain the film in tubular form under such conditions.

There has also been proposed still another method by which resin extruded from an extruding machine is cooled with cold water under application of pressure. In accordance with this method, the pressure inside the extruded film can be raised so that the film may be pressed against the cooling wall of the water-cooling tank and the film formation may be stabilized. However, this operation requires that a pressure container enclose a portion of the apparatus extending from the die through the water-cooling mechanism. This enclosure inevitably increases the size of the apparatus and adds to the complexity of operation.

Although the thickness of raw material for biaxial inflation stretching varies with the thickness of the film to be obtained by stretching, it is required to have a thickness not smaller than 200 microns as shown in Table 1.

Table 1

| Thickness of Raw Material | Stretching Ratio | Thickness of Stretched Film |
|---|---|---|
| About 230 microns | 5 (T.D) × 5 (M.D) = 25 (times) | About 9 microns |
| About 2600 microns | 8 (T.D) × 8 (M.D) = 64 (times) | About 40 microns |

(T.D. = Traverse Direction, M.D. = Mechanical Direction)

The conventional water-cooled inflation method proves convenient for stretching raw film of a thickness not exceeding 100 microns at a relatively high speed. This method, however, gives unstable stretching when the film thickness increases over 100 microns and it ceases to cause stretching when the film thickness exceeds about 500 microns.

It has now been found that by practice of the present invention, there is provided a new apparatus and improved method for production of tubular film more than 100 microns in thickness by biaxial inflation stretching using a watercooling tank fitted with a pliable element over an inner cylindrical wall defining a cooling zone, a sizing zone and a draining zone. In practice of the present invention, raw film of extruded thermoplastic resin is sized by application of an inner inflation pressure and an external suction pressure at the sizing zone with resultant production of a film having a smooth surface and uniform thickness.

The present process is particularly useful for effective biaxial inflation stretching of a film of polypropylene.

Generally stated, the present apparatus includes a water-cooling tank into which a tubular film of thermoplastic resin is extruded. The water-cooling tank is fitted over an inner cylindrical wall defining a cooling zone, a sizing zone and a draining zone with a pliable element having high water retention. One end of the pliable element is submerged in water of a water supply housing such that water is absorbed into the pliable element and passes therein along the cooling zone, the sizing zone and to the draining zone where it is removed. The cooling zone cools a tubularly inflated film of crystallizable thermoplastic resin to a temperature point immediately above the temperature of crystallization. In the sizing zone, the film is cooled to a temperature below crystallization while internal pressure and suction external pressure act on the film. After sizing, water adhering to the outer surface of the film is removed at the draining zone.

The method of the present invention provides for introducing a tubularly inflated film of crystallizable thermoplastic resin extruding through an annular slit of a die and into a water-cooling tank fitted with a pliable element having high water retention. The pliable element is fitted over an inner cylindrical wall defining a cooling zone, a sizing zone and a draining zone with one end of the pliable element being submerged in a water supply. Thus, by absorption, water passes from the supply into the element along the cooling and sizing zones and to the draining zone where it is removed. After being introduced into the water-cooling tank, the tubularly inflated film slides over the pliable element and is cooled to a temperature point immediately before the beginning of crystallization. Sizing of the film is effected by pressing against the pliable element at the sizing zone, the pressing being by means of inner pressure of the inflated film and suction pressure exerted through the pliable element at the sizing zone. Cooling and crystallizing the film occur in the sizing zone; and after sizing, water adhering to the outer surface of the film is removed by suction by passing outer surface water through the pliable element at the draining zone.

Practice of the present invention will become more apparent from the following description taken with reference to the accompanying drawings.

Figure 1:
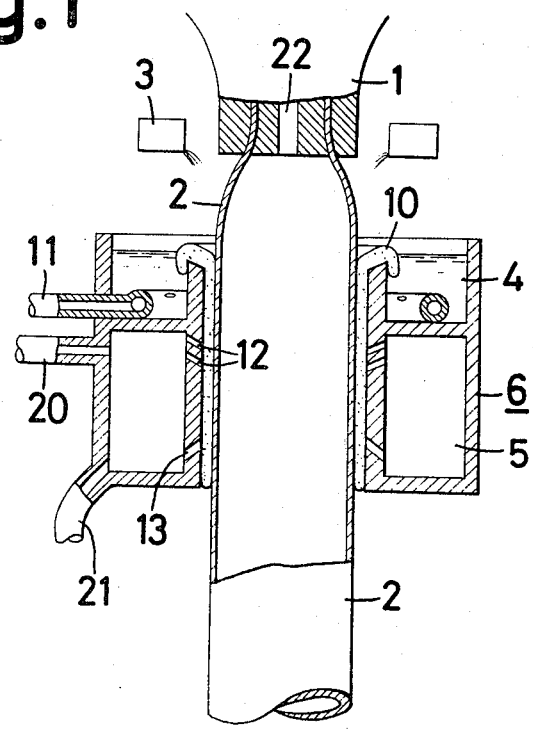
FIG. 1 is a partial cross section illustrating one embodiment of the water-cooling device according to this invention.
Figure 2:
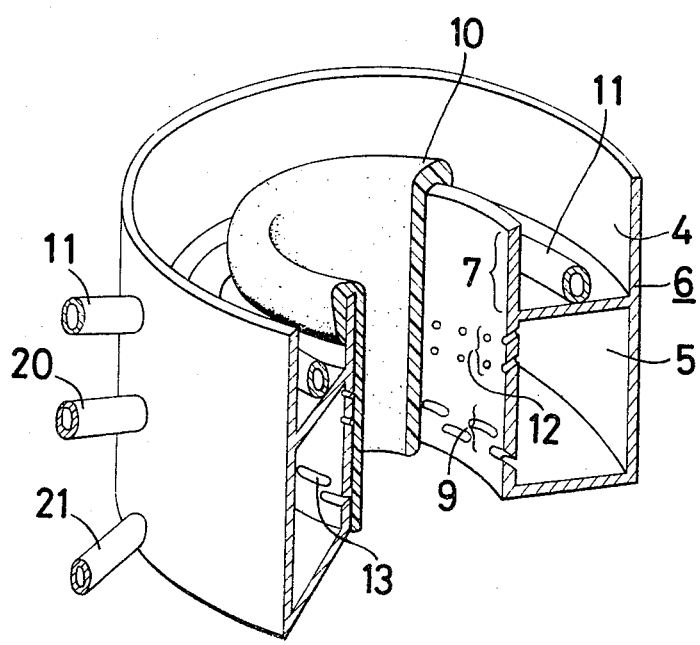
FIG. 2 is an oblique view of the water-cooling device of FIG. 1, with a portion cut away to show the interior detail.

Referring to FIG. 1 and FIG. 2, a tubular film 2 of a thermoplastic resin such as one having a thickness of 100 to 500 microns or greater, is extruded through ring die 1 of an extruding machine. The extruded resin is cooled with a gas injected through an air-cooling ring 3 provided at the extruding outlet of ring die 1 and then is let into water-cooling tank 6. The water-cooling tank 6 is constructed of water-cooling chamber 4, suction and draining chamber 5, with a cooling hole provided at the center to cool the film. Thus, the cooling hole is formed of a cylindrical wall defined by the inner wall of the water-cooling chamber 4, and the inner wall of the suction and draining chamber 5.

The embodiment shown in FIG. 1 represents a case in which the suction chamber and the draining chamber are formed integrally and the combined suction and draining chamber communicates with a pipe 20 incorporating a vacuum pump (not illustrated) so as to maintain this chamber in the state of a partial vacuum. The cooling hole of the water-cooling tank is composed of a cooling zone 7, a sizing zone 8 and a draining zone 9 arranged from top to bottom in this order, and these zones correspond to the inner walls respectively of the water-cooling chamber 4, the suction and draining chamber 5 which, in combination, make up the water-cooling tank 6. The inner wall of the cooling hole is fitted with a pliable cooling element 10 having exceptionally high water retention. The upper end of the pliable cooling element is immersed into water in the water-cooling chamber 4 so as to permit the entire cooling element to be wetted sufficiently with the cooling water which is absorbed into the pliable cooling element from the water-cooling chamber 4.

The pliable cooling element may be made of felt-like material, unwoven fabric, tufty material or spongy material provided that the substance has high water retention and is capable of absorbing water from the cooling-water chamber and passing it along the cooling and sizing zones. Inside the water-cooling chamber, there is provided a water-feeding pipe 11 which serves to keep the water at a constant level in the water-cooling chamber by supplying cold water whenever there is a fall of water level therein. Thus, the end of the pliable cooling element is always submerged in the supply of water in the water-cooling chamber.

Film 2 which has been brought to the cooling hole of water-cooling tank 6 is placed under a suitable magnitude of inner pressure by means of the air being introduced through air-injecting orifice 22 and, in that state, is allowed to slide over the surface of the pliable cooling zone 7, with the result being that it begins to undergo cooling by the cold water retained in said element 10. While passing this cooling zone, the film is still in an uncrystallized state. As the film 2 advances and begins to slide over sizing zone 8, it is attracted toward the wall and held fast against the element 10 because of the combined forces of suction exerted through a plurality of suction orifices 12 formed on the inner wall of the suction chamber 5 and the internal pressure of air from orifice 22. Consequently, the film is given a perfectly annular shape by the combined inner air pressure and external suction pressure while it is cooled and crystallized by the cold water. For this purpose, entrance of the sizing zone is formed at a position immediately preceding the position at which crystallization begins to occur on the film of resin, so that the film may be pressed with sufficient force against the inner wall of the cooling hole by means of the inner pressure applied inside the film and the suction exerted by the suction chamber and, in that state, the film is shaped to a fixed annular form and, at the same time, is crystallized. The suction exerted by the suction chamber must attract the film firmly against the wall and confers tubular form to the film without removing water from the film. Thus, the suction orifices 12 are desirably inclined downwardly, as illustrated, in the inward direction. Although the walls defining the suction orifices may be in any desired configuration, an excessively large suction area for a given orifice produces abnormal noise and hinders the travel of film.

The degree of vacuum inside the suction chamber 5 is such as to allow the film to be attracted firmly against the inner wall of the cooling orifices 12 without obstructing the travel of film 2. Usually, this degree of vacuum falls in the range of 50 mmHg to 500 mmHg. The film which has acquired a perfect annular form advances toward the draining zone 9 while being cooled further by the cooling water retained in the pliable element 10. While the film is sliding over the surface of the draining zone, the draining orifices 13 formed on the inner cylindrical wall of the draining chamber exert suction so as to remove water adhering to the film surface together with the water present in the pliable element. The water which has been stored in the draining chamber by such suction is then discharged from pipe 21. For the purpose of removing the water from the entire surface of the film, the draining orifices 13 are desirably narrow ovate holes elongated in the circumferential direction as illustrated in FIG. 2. At the time of the aforementioned suction, the pliable cooling element effectively serves the part of a vacuum seal, and, as such, prevents cold water from flowing out of the water-cooling tank 6. The film which has been shaped to tubular form as mentioned above is forwarded to nip rollers, folded in a flat form and then taken up on a reel.

Figure 3:
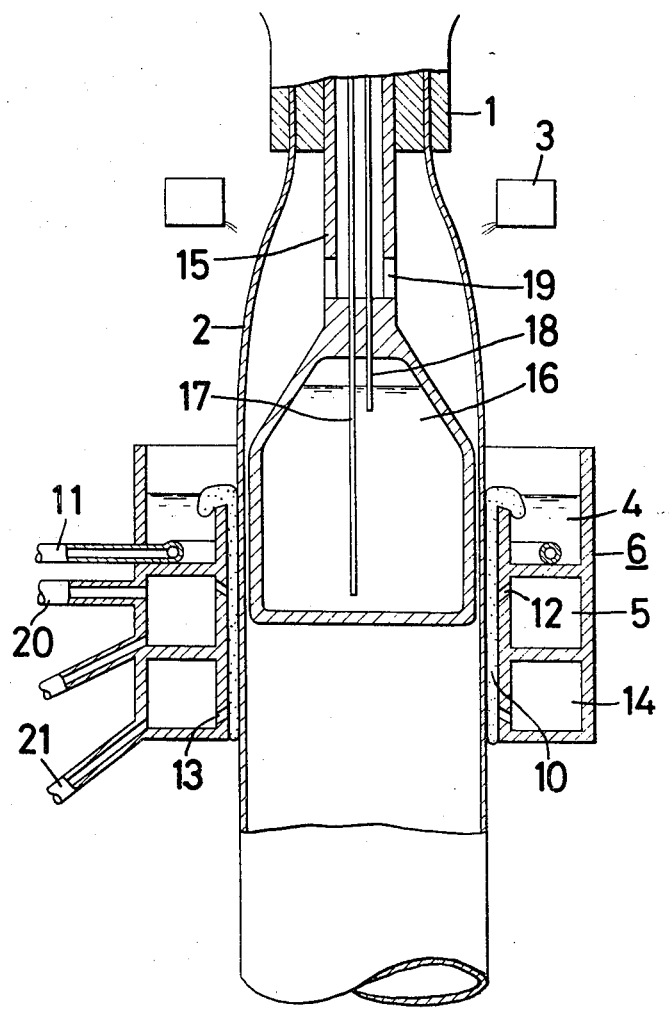
FIG. 3 is a cross sectional view illustration another embodiment of the present invention.

FIG. 3 represents an embodiment having a mandrel so disposed as to be inserted inside a tubularly inflated film. Referring to the drawing, the film 2 extruded through the ring die 1 is cooled by gas injected from air-cooling ring 3 and thereafter, the film is led to the water-cooling tank 6 which has a pliable element of exceptionally high water retention fitted on the inner cylindrical wall thereof defining a cooling hole at the center. Similarly to the embodiment of FIG. 1, the water-cooling tank 6 is composed of water-cooling chamber 4, a suction chamber 5 and a draining chamber 14, and the cooling hole at the center consists of a cooling zone, a sizing zone and a draining zone. One end of the pliable element is immersed in water supplied from the water-cooling chamber.

From the center of the base of ring die 1, there protrudes a cylindrical supporting rod 15. To the forward end of the supporting rod, there is attached a hollow mandrel 16. Inside the supporting rod 15, there is a feed pipe 17 and a discharge pipe 18 for circulating coolant. The pipes are so fixed as to pass into the interior of the mandrel and supply a suitable liquid coolant to the mandrel. Further, the supporting rod 15 is used as a feed pipe for delivering air into the tube of film. Air which is supplied through opening 19 is of suitable magnitude such that the resultant inner pressure to the film presses the film firmly against the surface of the cooling element 10 along the cylindrical wall of the cooling hole and thus prevents the inner surface of the film from coming into contact with the mandrel.

The film which has been led to the water-cooling tank is cooled in the cooling zone of the cooling hole to a temperature point immediately before the beginning of crystallization and then is crystallized while being shaped to tubular form by combined forces of the inner air pressure and the external suction exerted in the sizing zone. At the same time, the film is cooled internally by means of the mandrel. After undergoing additional cooling by the pliable element 10, the film is drained of water in the draining zone to produce a shaped film. The position and configuration of suction orifices 12 disposed to apply suction pressure without significant water removal, and that of water draining orifices 13 disposed to remove water from the pliable element and its further function of a vacuum seal all correspond to that indicated in FIGS. 1–2.

In accordance with the method of this invention, the film is prevented from sliding directly over the inner wall of the water-cooling tank as mentioned above and, therefore, does not sustain sliding scars on its surface. Since the sizing zone utilizing the force of suction at a temperature point immediately before the point at which crystallization begins to occur and the film is allowed to undergo crystallization while being pressed sufficiently firmly against the inner wall of cooling hole, the film can be cooled sufficiently without involving uneven film thickness or non-uniform tube diameter even when the film has a large thickness such as in excess of 100 microns.

Furthermore, cooling is also provided by the cooling element having exceptionally high water retention, and, if required, supplemental cooling is provided by means of the mandrel. Thus, the cooling may be accomplished to perfection and the cooling element permits production of a film of large thickness having a smooth surface at a high speed.

Practice of this invention is further illustrated in the following non-limiting examples.

EXAMPLE 1

In a device having a design such as the one shown in FIG. 1, the water-cooling tank was provided with a cooling hole about 200 mm in length, suction orifices 5 mm in diameter arranged at intervals of 10 mm in two staggered rows about 50 mm from the upper limit of the water-cooling hole and a tufty fabric was fitted as a cooling element on the inner cylindrical wall of the cooling hole. The degree of vacuum was fixed at 100 mmHg inside the suction chamber. When a tubular film of polyethylene having a melt index of 0.70 was extruded from an extruding machine fitted with a die 100 mm in diameter heated to about 250°C and passed into the aforementioned water-cooling tank, a roll of uniform film 400 microns in thickness and 160 mm in folded diameter which was free from sags, wrinkles and sliding scars was obtained at an operation speed of 1.6 m/min.

The roll of film thus obtained was then stretched to M.D × T.D = 6 × 6.6 to afford a polyethylene sheet 10 microns in thickness. The results of the strength tests conducted on the resultant sheet are shown in Table 2.

Table 2

| Tensile Strength | Elongation | Tear | Impact | Haze |
|---|---|---|---|---|
| M.D 965.7 kg/cm² | 29% | 2.2 kg/cm | 337.5 | |
| T.D 1001.3 kg/cm² | 32% | 3.15 kg/cm | kg·cm/mm | 48.8% |

EXAMPLE 2

In the device of Example 1, viscous sponge 2 mm in thickness was set in position as a cooling element. When a tubular film of polypropylene having a melt index of 1 was introduced into the device, a roll of film having a thickness of 1,500 microns and a uniform folded diameter which was free from sags, wrinkles and sliding scars was obtained at an operation speed of 2.1 m/min.

The resultant roll of film was then stretched to M.D. × T.D = 7 × 7 to afford a polypropylene sheet about 30 microns in thickness. In the strength tests conducted on the sheet, the tensile strength was found to be 2,100 kg/cm² in the mechanical direction and 2,050 kg/cm² in the traverse direction and the elongation to be 51 and 58% respectively.

EXAMPLE 3

A tubular film of polypropylene having a melt index of 2.0 was introduced into a water-cooling tank of the type set forth in Example 1 and incorporating a mandrel of the type shown in FIG. 3. As a consequence, a roll of film 700 microns in thickness which was free from sags, wrinkles and sliding scars was obtained at an operation speed of 2.4 m/min.

In this case, the degree of vacuum in the suction chamber was 100 mmHg and the pressure applied inside the tube of film was 1 mmHg.

The roll of film thus obtained was stretched to M.D × T.D = 6 × 6 to afford a polypropylene sheet about 20 microns in thickness. In the strength tests conducted on this sheet, the tensile strength was found to be 1,890 kg/cm$^2$ in the mechanical direction and 1,560 kg/cm$^2$ in the traverse direction and the elongation to be 80.5 and 74% respectively.

Having described the present invention, it will be readily understood that the foregoing detailed description is given merely by way of illustration, and that many variations may be made therein without departing from the invention as defined.

What is claimed is:

1. An apparatus for production of a tubular film of crystallized thermoplastic resin which comprises in combination, a thermoplastic resin extruding ring for extruding a tubular film of crystallizable thermoplastic film, an inflation means for inflating said tubular film, and a water-cooling tank, said water-cooling tank having an inner cylindrical wall defining a cooling zone, a sizing zone and a draining zone, a pliable cooling element having high water retention disposed over the inner cylindrical wall, a water supply chamber, one end of said pliable cooling element being immersed in water in said water supply chamber, suction orifices disposed through the cylindrical wall at the sizing zone and passing to a vacuum chamber, water draining orifices disposed through the cylindrical wall at the draining zone and passing to a water drain chamber, and means for passing the extruded film of thermoplastic film from the extruding ring into the water-cooling tank wherein the film is cooled to a temperature below the crystallization point at the sizing zone while under influence of internal pressure and external suction.

2. The apparatus of claim 1 wherein the vacuum chamber and the water drain chamber define a common chamber.

3. The apparatus of claim 1 wherein the thickness of the extruded tubular film of crystallizable thermoplastic resin is in excess of 100 microns.

4. The apparatus of claim 1 wherein means are included for removing water from the water drain chamber.

5. The apparatus of claim 1 wherein the water supply chamber is disposed as an annular chamber about the inner cylindrical wall and includes a water make-up supply means.

6. The apparatus of claim 1 wherein air cooling means are provided between the extruding ring and the water-cooling tank.

7. The apparatus of claim 1 wherein the suction orifices are inclined downwardly in an inner direction from the suction chamber.

8. The apparatus of claim 1 wherein the water draining orifices are oblong and inclined upwardly in an inner direction from the water drain chamber.

9. The apparatus of claim 1 wherein a mandrel is disposed inside the tubularly inflated film along the cooling and sizing zones.

10. The apparatus of claim 9 wherein a coolant is circulated in the mandrel.

11. A method for the production of a tubular film of thermoplastic resin, said process comprising the steps of (1) introducing a tubularly inflated film of crystallizable thermoplastic resin extruded through an annular slit of a die and kept under a suitable magnitide of inner pressure into a water-cooling tank having (a) a water-cooling chamber retaining cooling water, (b) a suction and draining chamber having suction orifices and draining orifices on the inner surface thereof, and (c) a cooling hole fitted with a pliable element having high water retention, the upper end of which is immersed in the cooling water in said water-cooling chamber to maintain the water retention thereof at a high level, said cooling hole being composed of a cooling zone, and a sizing zone and a draining zone which communicate with said suction and draining chamber through the suction orifices and draining orifices, (2) sliding the tubularly inflated film over the pliable element at the cooling zone of the cooling hole and cooling the film to a temperature point immediately before the beginning of crystallization, (3) further cooling the film to a temperature below the crystallization point by sliding the cooled film over the pliable element at the sizing zone of the cooling hole, thereby permitting the film to undergo crystallization, and at the same time, pressing the film against the pliable element by means of the inner pressure of the inflated film and suction exerted through the pliable element, thereby conferring tubular form to the film, and (4) removing water adhering to the outer surface of the film by sliding the film over the pliable element at the draining zone of the cooling hole.

* * * * *